United States Patent [19]

Blachman

[11] 3,856,647

[45] Dec. 24, 1974

[54] MULTI-LAYER CONTROL OR STRESS IN THIN FILMS

[75] Inventor: Arthur Gilbert Blachman, Briarcliff Manor, N.Y.

[73] Assignee: International Business Machines Corporation, Armonk, N.Y.

[22] Filed: May 15, 1973

[21] Appl. No.: 360,693

[52] U.S. Cl. .............................................. 204/192
[51] Int. Cl. .......................................... C23c 15/00
[58] Field of Search .................................... 204/192

[56] References Cited

UNITED STATES PATENTS

| | | | |
|---|---|---|---|
| 3,218,194 | 11/1965 | Maissel | 204/192 |
| 3,395,089 | 7/1968 | Mayer et al. | 204/192 |
| 3,400,066 | 9/1968 | Caswell et al. | 204/192 |
| 3,607,384 | 9/1971 | Banks | 204/192 |
| 3,627,662 | 12/1971 | Feuersanger | 204/192 |

OTHER PUBLICATIONS

Blachman, "Stress and Resistivity Control in Sputtered Molybdenum Films and Comparison with Sputtered Gold," Metallurgical Transactions, Vol. 2, March 1971, pp. 699–709.

*Primary Examiner*—John H. Mack
*Assistant Examiner*—Wayne A. Langel
*Attorney, Agent, or Firm*—George Baron

[57] ABSTRACT

Planar metallic thin film technology requires the deposition of low resistivity metal paths on small chips of insulated or semiconductor material.

Metal, i.e., molybdenum, when sputtered directly onto a substrate to which controlled d.c. voltage was applied, could be laid down with low stress, but relatively high resistivity. Low resistivity, as well as low stress, are achievable by using a first layer of molybdenum as a control layer and then sputtering a second layer of molybdenum, at a different d.c. voltage bias and/or thickness than the first layer, to obtain a thin film having low resistivity as well as low stress.

6 Claims, 5 Drawing Figures

MULTI-LAYER CONTROL OR STRESS IN THIN FILMS

BACKGROUND OF THE INVENTION

In the sputtering of suitable thin metallic films onto an insulated substrate for the purpose of manufacturing microelectronic circuitry, it is necessary to obtain films of the proper resistivity and low stress. Highly stressed films tend to peel, crack, craze or otherwise become detached from their substrates so that units of microcircuitry have to be discarded very often soon after they are put into operation. Additionally, many thin metal films of the order of 3,000A or less, when deposited in a highly stressed condition, tend to grow fine crystals, or hillocks, in either direction of the films, such hillocks tending to puncture any insulation films covering said metal films, and thus interfere with the operation of a device or structure employing the metal films. Furthermore, it has also been observed that minimum resistance in metal films, e.g., nichrome films, could be obtained by controlling the d.c. bias voltage on a substrate during a sputtering process. Such nichrome films had not only minimum resistance, when so deposited, but also minimum stress.

When attempts were made to obtain low resistance, low stress single films of molybdenum by the same technique employed for nichrome films, it was found that low stress films could only be achieved at the expense of higher than minimum resistance. However, as this invention will teach, by using a first thin layer of molybdenum as a control layer, a second layer of molybdenum can be deposited at a different substrate voltage bias and/or different thicknesses so that low resistance films, as well as low stressed films, are obtained, or the stress can be controlled to have a desired value between a wide range of values.

A discussion treating of the net stress to be expected in a multilayer film structure is found in an article entitled "Stresses Developed in Optical Film Coatings" by A. E. Ennos, Applied Physics, January 1966, Volume 5, Number 1, pages 51–61. Another treatment of stress and resistivity control of single metal films is set forth in an article entitled "Stress and Resistivity Control in Sputtered Molybdenum Films and Comparison with sputtered Gold" by A. G. Blachman which appeared in the March 1971 issue of "Metallurgical Transactions," Volume 2, pages 699–709.

In none of the above noted publications is there a teaching of how one can achieve a sputtered layer of molybdenum, having minimum resistance and minimum stress, by depositing a first layer of molybdenum at a given substrate bias and then using the first layer as a substrate for a second layer to be sputtered thereon so as to obtain a minimum resistance, low stressed multi-layer of molybdenum.

Consequently, it is an object of this invention to achieve minimum stressed, minimum resistivity molybdenum films.

It is yet another object to deposit multi-layered films during a single vacuum pump down so as to achieve minimum resistivity, mimimum stressed films.

It is a further object to use a first deposited metal film as a control layer for a second metal film so as to achieve minimum resistivity and/or a desired stress in the multi-layer structure, where the net stress is not that predictable by the prior art.

Figure 1:
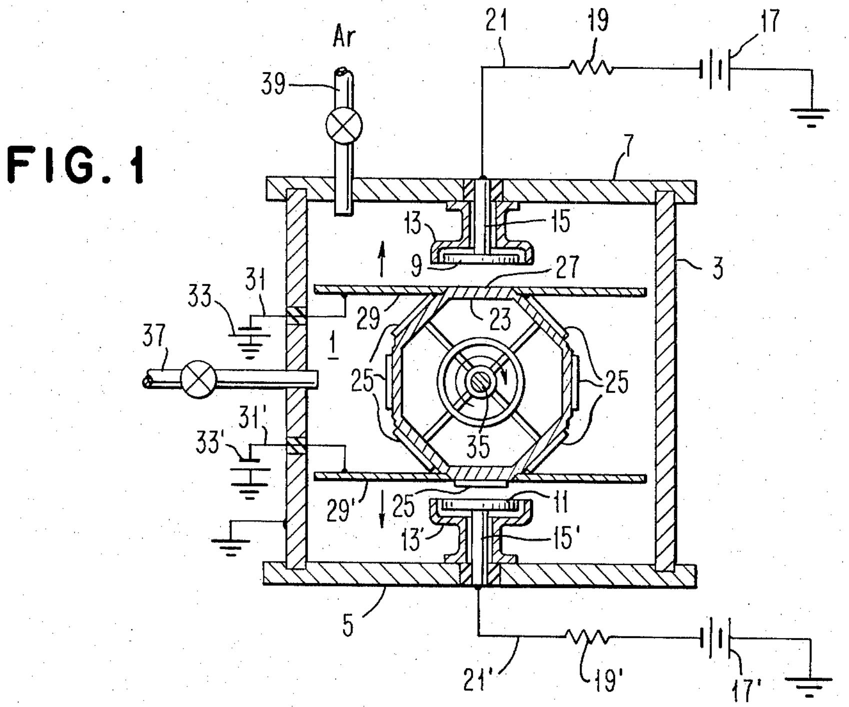
FIG. 1 is a cross-sectional view of a sputtering system employed in depositing the multi-layered films of the present invention.

The desired multiple layered thin film is manufactured by using the dual cathode sputtering apparatus of FIG. 1, which structure is shown and described in greater detail in U.S. Pat. No. 3,400,066 to Caswell, et al., which issued on Sept. 3, 1968. The apparatus comprises a sputtering chamber 1 including a cylinder member 3 supported within appropriate recesses contained in lower and upper plates 5 and 7, respectively. Cylinder member 3 and plates 5 and 7, when joined, define a high vacuum chamber capable of maintaining pressures as low as the order of $10^{-10}$ torr. Cylindrical member 3 as well as plate members 5 and 7 are formed of metallic material and are maintained at ground potential to serve as an anode during the deposition process.

A first target structure 9 is supported from upper plate member 7 and within shield member 13 by a conductive post 15. A second target structure 11 is supported from lower plate member 5, and within a shield member 13' by a conductive post 15'. Posts 15 and 15' extend through vacuum seals in upper and lower members 7 and 5, respectively, and the respective planar surfaces of targets 9 and 11 are registered and lie in parallel planes. Such targets 9 and 11 are connected to respective high voltage souce 7 and 17' of the order of -1,000 to -5,000 volts, along dropping resistors 19 and 19' and leads 21 and 21' connected at posts 15 and 15'. As described in greater detail in said U.S. Pat. No. 3,400,066, precision resistors 19 and 19' are used to monitor ion charge current $I_c$ to targets 9 and 11, respectively, for control of thickness t during the sputtering process.

Rotatable octangular structure 23, formed of conductive material, is positioned intermediate targets 9 and 11, the particular surfaces thereof being adapted to support and electrically contact substrate 25 upon which a plurality of molybdenum films are to be deposited. Substrates 25 are supported, in turn, adjacent targets 9 and 11 and spaced to support a glow discharge therebetween. One surface 27 of structure 23 does not support a substrate, but is used during presputtering of targets 9 and 11 to remove surface contaminants, e.g., oxidized layers, and establish system equilibrium prior to actual deposition. The surface of substrates not positioned adjacent targets 9 and 11 are protected by annular shutter elements 29 and 29' formed of conductive material. The interior edges of shutter elements 29 and 29' are received within recesses cut in the apexes of structure. Exterior edges of shutter elements 29 and 29′ are closely spaced with respect to the interior surface of cylindrical member 3 to define distinct sputtering chambers. Shutter elements 29 and 29′ are connected along their respective leads 31 and 31′ which extend through vacuum seals in cylindrical member 3 to negative voltage sources 33 and 33′ utilized for substrate biasing. When shutter elements 29 and 29′ contact structure 23, substrates 25 are biased at a value of approximately 0 to −200V. During sputtering, only substrates 25, positioned adjacent targets 9 and 11, are exposed to sputtered target materials, whereas remaining substrates 25 are protected. Shutter elements 29 and 29′ are movable in a vertical direction, as indicated by the arrows, to allow rotation of structure 23 about shaft 35 and successive positioning of other substrates 25 adjacent target 9 and 11, respectively.

The interior of chamber 1 is connected along valved duct 37 to a high-efficiency vacuum pump system, not shown, capable of reducing pressure therein, for example, to the range of $10^{-10}$ torr. Also, the interior of chamber 1 is connected to a source of sputtering gas, e.g., argon (Ar), along valved duct 39. It is evident that sources of other nonactive gases are provided if the respective partial pressures of such gases within chamber 1 are also to be controlled.

In using the sputtering chamber of FIG. 1, a single conducting molybdenum (Mo) film was sputtered onto an oxidized silicon substrate wherein the film had a thickness of 3,000–6,000A. A d.c. sputtering bias of approximately −110 to −115 volts was placed on the substrate 25 in order to obtain a Mo film having minimum resistivity, but the latter was deposited under an undesired compressive stress of $(2-4) \times 10^9$ dyne/cm$^2$.

Figure 2:
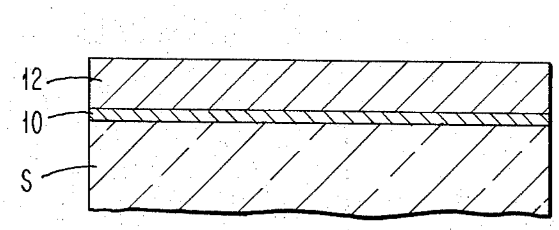
FIG. 2 is a cross-sectional view of the multi-layered structure obtained by a sputtering process using the apparatus of FIG. 1.

By employing the system of FIG. 1 to fabricate the two-layered structure of FIG. 2, a multi-layered film is built up wherein the lower molybdenum thin film 10 is deposited on an oxidized silicon substrate s, followed by a thicker MO film 12. Thin film 10 is deposited, using a bias voltage on substrate s that gives a controllable stress to the composite structure comprising films 10 and 12 whereas the top thicker film 12 is deposited at a substrate bias corresponding to minimum resistivity.

Figure 3:
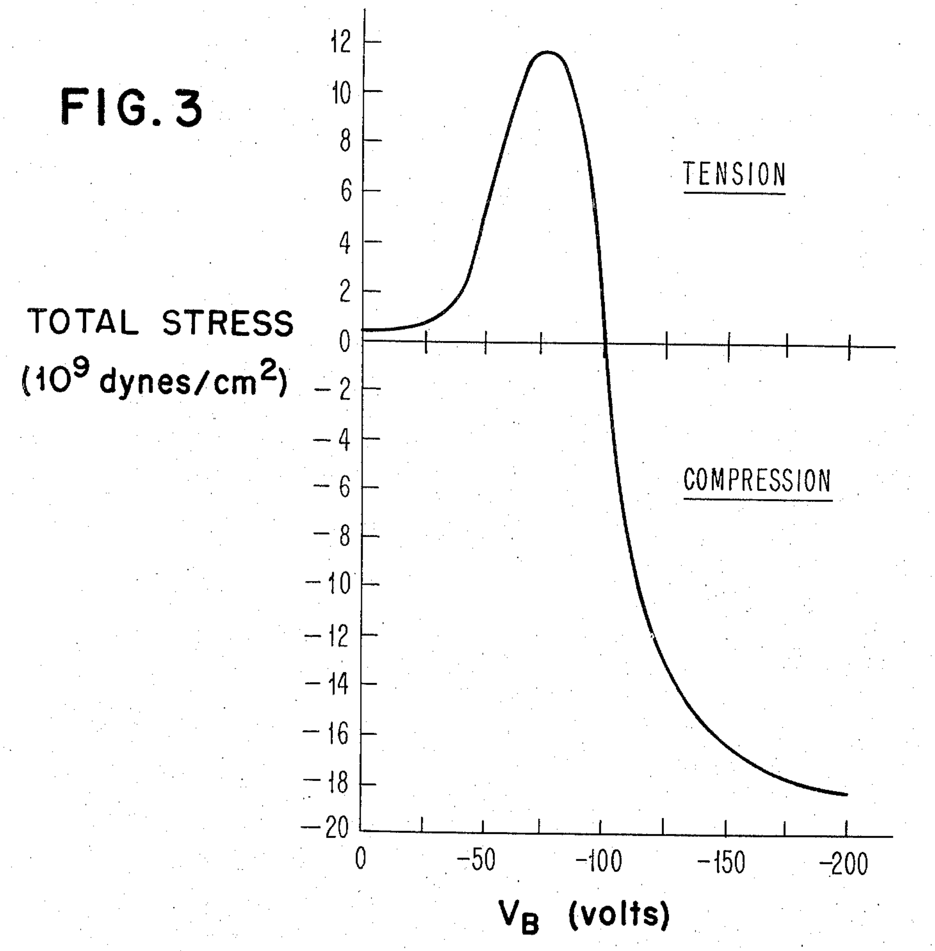
FIG. 3 is a plot of stress vs sputtering bias for a single 1,000A Mo film.

FIG. 3 shows the measured variation of total stress with applied d.c. bias to a substrate s of oxidized silicon for a single 1,000A thick Mo film 10 deposited on that substrate held at 120°C during deposition. As seen in FIG. 3, minimum stress occurs at about a substrate voltage bias, $V_B$, of −100 volts. Such initial film 10 forms a stress-controlling layer for the minimum resistivity film 12 deposited thereon.

A number of multiple films were constructed in the following manner. A first thin Mo layer 10, of the order of 1,000A or less, was deposited at a given bias $V_B$, after which a second thicker Mo layer 12 was deposited at a fixed substrate bias of −110 volts. Subsequent multiple layers were deposited wherein different substrate biases $V_{B_1}$, $V_{B_2}$, $V_{B_3}$, etc. were used to obtain thin Mo layer 10, but the top layer 12 was always deposited using the same fixed bias of −110 volts that corresponds to minimum resistivity for the thicker film 12.

Figure 4:
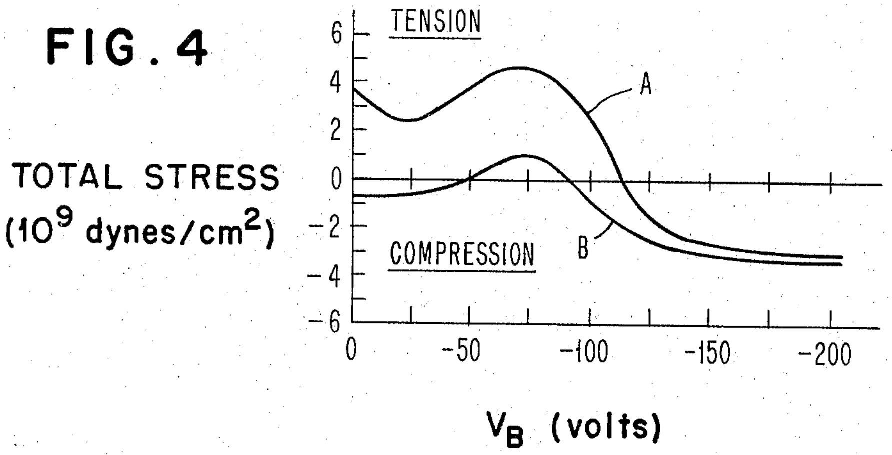
FIG. 4 is a plot of stress in the multi-layer film versus the d.c. bias used in depositing the film 10 of FIG. 2 in the sputtering system of FIG. 1, where (A) is empirically determined and (B) represents expectation of prior art.

Curve A of FIG. 4 is a plot of the measured total stress for the multi-layer structure of FIG. 2, wherein layer 10 is a 1,000A thick Mo film deposited at the substrate bias $V_B$ indicated along the abscissa and layer 12 is a 6,000A thick Mo film that was deposited over layer 10 without breaking vacuum, at a voltage bias of −110 volts. The top layer 12 is sufficiently thicker than the bottom layer 10 so as to be controlling of the final resistivity of the multi-layer structure.

Figure 5:
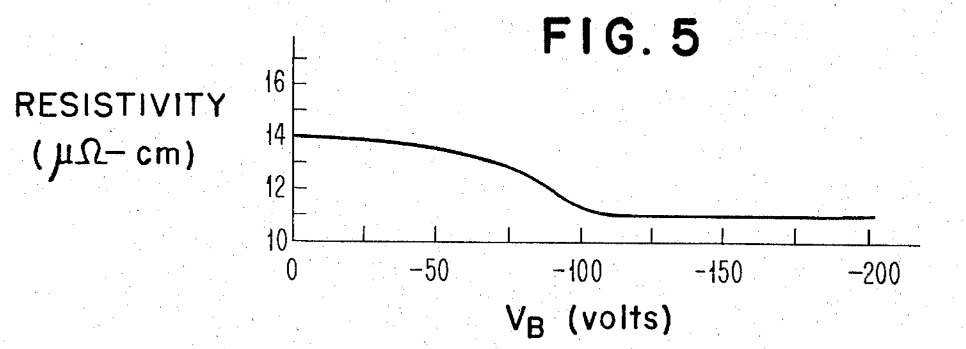
FIG. 5 is a plot of resistivity in the multi-layer film versus d.c. bias applied in depositing the film 10 of FIG. 2 in the sputtering system of FIG. 1.

FIG. 5 shows the resistivity of the composite multilayer of FIG. 2 plotted against the bias applied in depositing control layer 10. Comparision of FIG. 5 with curve A of FIG. 4 shows that the zero stress condition at $V_B = (-115)$ volts corresponds to the minimum resistivity for the multi-layered structure.

The total measured stress plotted in FIG. 4 is the sum of the thermal expansion mismatch stress $\sigma_t$ and the intrinsic stress $\sigma_i$. $\sigma_t$ depends on the difference between the temperature at which the film is deposited (here 120°C) and that at which the total stress is meaured, i.e., at which the film is used (here room temperature). The intrinsic stress $\sigma_i$ is dependent on the conditions of film deposition (including bias) and is presumably related to the film nucleation and growth process. The multi-layer intrinsic stress predicted by theory and expected for refractory films such as Mo in the configuration of FIG. 2 would be given by $$\sigma_i = \sigma_{i1} t_1 + \sigma_{i2} t_2 / t_1 + t_2 \quad (1)$$

where $\sigma_{i1}$ and $\sigma_{i2}$ are the intrinsic stresses developed individually in the 1st and 2nd layers 10 and 12, respectively, with $t_1$ and $t_2$ the respective layer thicknesses. Adding the thermal stress $\sigma_t$ to the $\sigma_i$ determined from Eq. 1 results in curve B of FIG. 4, showing that the bias condition expected, prior to this invention, for $\sigma_{total} = \sigma_t + \sigma_i = 0$ differs significantly from that empirically determined [curve A] and would not yield a multi-layer film of minimum resistivity.

Since the lower thin layer 10 determines the ultimate stress characteristic of the combined film and the upper thicker layer 12 the ultimate resistivity of the combined layer, one can use the teachings of this invention to fabricate composite layers of different materials, particularly using for the lower stress-controlling layer the higher melting point materials, such as tungsten, niobium, iron, nickel or molybdenum. Thus the lower layer 10 would be one of the above noted metals and the upper layer 12 would be the same or different metal, and a number of multi-layers of these metals would be deposited wherein the applied bias for the first thin layer would be varied from multi-layer to multi-layer, but the second thicker layer of each separate multi-layer would be held constant.

A curve (curve A) for such combination of metals is shown in FIG. 4 and would be empirically drawn (as shown here for the case of Mo on Mo) so that the total stress of the multi-layer structure is determined for different biases $V_B$ on the first layer 10 during its deposition. Not only does curve A show that one can make a multi-layered structure achieving minimum resistivity, but a total stress can be made to be zero (by choosing a $V_B$ of −115 volts), or can be made either tensile or compressive by suitable choice of the substrate bias employed in depositing underlayer 10.

What is claimed is:

1. In a method for achieving a minimum resistivity, minimum stressed conducting thin film comprising the steps of sputter depositing a thin layer of a refractory metal on a substrate at a first voltage bias on said substrate, said voltage being selected to produce a multi-layer of minimum stress, and then sputter depositing a thicker layer of another refractory metal over said first layer at a second voltage bias on said substrate different from said first voltage bias and corresponding to that bias voltage which produces a multi-layer of minimum resistivity.

2. In a method for achieving a minimum resistivity, minimum stressed conducting thin film comprising the steps of sputter depositing a thin layer of molybdenum on a substrate at a first voltage bias on said substrate, said voltage bias being selected to produce a multi-layer of minimum stress, and sputter depositing a thicker layer of molybdenum over said first layer at a second voltage bias on said substrate different from said first bias and corresponding to that bias voltage which produces a milti-layer of minimum resistivity.

3. In the method of claim 2 wherein said thin layer of molybdenum is about 1,000A and said first bias voltage is approximately −115 volts.

4. In a method for achieving minimum resistivity and controlled stress in a conducting thin film comprising the steps of sputter depositing a thin layer of molybdenum on a substrate at a first voltage bias on said substrate, sputter depositing a thicker layer of molybdenum on said thin layer at a second voltage bias, different from said first voltage bias, that corresponds to a minimum resistivity in said second layer for the conditions of deposition of said first layer said conditions being maintained during the deposition of said first layer so that more negative substrate biases than −115 volts will create compression in the combined multi-layer of molybdenum, and substrate biases more positive than −115 volts will create tension in said combined multi-layer of molybdenum.

5. In the method of claim 4 wherein said first layer contacting said substrate is approximately 1,000A and said second layer atop of said first layer is sufficiently thicker than said first layer so as to govern the ultimate resistivity of the combined layers.

6. In the method of claim 5 wherein said second layer atop of said first layer is ≥ 6,000A.

* * * * *